United States Patent
Poulin et al.

(10) Patent No.: US 6,234,527 B1
(45) Date of Patent: May 22, 2001

(54) LIFTING DEVICE FOR LATERAL DISPLACEMENT OF THE TRAILING END OF ROAD VEHICLES

(76) Inventors: Pierre Poulin, 414, rue St-Hilaire, C.P. 50, Saint-Anges-de-Beauces, P.Q. (CA), G0S 3E0; Jean Poulin, 328, rue Jean-Cadieux, Varennes, P.Q. (CA), J3X 1H6

( * ) Notice: Subject to any disclaimer, the term of this patent is extended or adjusted under 35 U.S.C. 154(b) by 0 days.

(21) Appl. No.: 09/494,425

(22) Filed: Jan. 31, 2000

(51) Int. Cl.[7] .................................................. B60S 9/20
(52) U.S. Cl. ............................................. 280/761; 280/767
(58) Field of Search ............................. 280/761, 763.1, 280/766.1, 767; 180/199, 200

(56) References Cited

U.S. PATENT DOCUMENTS

| | | | |
|---|---|---|---|
| 1,736,498 | * | 11/1929 | Jensen . |
| 2,692,143 | * | 10/1954 | Rando . |
| 2,784,793 | * | 3/1957 | Rando . |
| 4,605,086 | * | 8/1986 | Marom ................................. 180/202 |
| 5,419,580 | * | 5/1995 | Ku ......................................... 280/761 |
| 5,752,587 | * | 5/1998 | Darling .................................... 188/5 |
| 5,807,057 | * | 9/1998 | Nijenhuis .............................. 414/475 |

* cited by examiner

Primary Examiner—Kevin Hurley

(57) ABSTRACT

A lifting device for lifting the trailing end of a road vehicle and used to laterally displace the same. The lifting device includes a main body including a fixed section adapted to be rigidly secured to the trailing end, a first mobile section essentially vertically movable relative to the fixed section between an elevated non-operative position and a lowered operative position for lifting the trailing end, and a second mobile section being essentially rotatably mounted on the first mobile section. The lifting device also includes a linear actuator device to linearly move the first mobile section relative to the fixed section, a rotary actuator device to for rotating the second mobile section relative to the first mobile section, a rolling device freely pivotally mounted on to the second mobile section to rollingly engage a road surface, a blocking mechanism to temporarily block the rotary actuator device from rotating when the lifting device is in the operative position, and a power source to activate both actuator devices.

12 Claims, 10 Drawing Sheets

LIFTING DEVICE FOR LATERAL DISPLACEMENT OF THE TRAILING END OF ROAD VEHICLES

FIELD OF THE INVENTION

The present invention relates to a lifting device and more specifically a device to lift the trailing end of a road vehicle and allow for its lateral displacement when towed by a tractor or the like.

BACKGROUND OF THE INVENTION

It is known that tractor-trailer units often have steering difficulties, especially when the trailer is long and the road narrow, causing the rear wheels of the trailer to either hit the corner of the sidewalks or go over to corner ditch, thereby causing the trailer to dangerously tilt sideways, when not tilting over and falling off.

In order to avoid the above problems, most of the tractor-trailer units need to take much wider turns, whenever possible, and go over opposite side traffic lanes that may cause road accidents. Also, the tractor-trailer units need to go through much longer road paths to avoid any narrow roads to get to their final destination, thus increasing travel time and reducing the efficiency of the cargo delivery network.

To obviate the above problems, many mechanisms provide for a self steering of the rear wheel train. Such mechanisms, as shown in U.S. Pat. No. 3,930,669 to Kollander et al, U.S. Pat. No. 5,197,751 to Rankel, U.S. Pat. No. 5,213,353 to Williams and U.S. Pat. No. 5,246,242 to Penzotti, are expensive and require special rear wheel trains since they are built-in the latter. Also, in case of breakage of the mechanism, the rear wheel train must be fixed before the trailer can move again, thus causing more problems of towing the trailer away for repair.

OBJECTS OF THE INVENTION

It is therefore a general object of the present invention to provide a lifting device for lateral displacement of the trailing end of road vehicles that obviates the above noted disadvantages.

Another object of the present invention is to provide a lifting device for lateral displacement of the trailing end of road vehicles that allows for lifting of the trailing end of the trailer, or the like, and lateral displacement of the same when it is towed by a tractor.

It is a further object of the present invention is to provide a lifting device for lateral displacement of the trailing end of road vehicles that is easily adaptable to most of the trailers without having to change the existing rear wheel train.

It is yet another object of the present invention is to provide a lifting device for lateral displacement of the trailing end of road vehicles that can be easily mounted in dismounted, in case of breakage, to any trailer.

SUMMARY OF THE INVENTION

The present invention is directed to a lifting device for lifting the trailing end of a road vehicle and used to laterally displace said trailing end, said lifting device comprising a main body including a fixed section adapted to be rigidly secured to said trailing end, a first mobile section essentially vertically movable relative to said fixed section between an elevated non-operative position and a lowered operative position for lifting said trailing end, and a second mobile section being essentially rotatably mounted on said first mobile section, a first actuator device to linearly move said first mobile section relative to said fixed section, a second actuator device for rotating said second mobile section relative to said first mobile section, a rolling device secured to said second mobile section to rollingly engage a road surface, a blocking mechanism to temporarily block said second actuator device from rotating when in said operative position, and a power source to activate both said first and second actuator devices.

Preferably, the rolling device is pivotally mounted on said second mobile section.

Preferably, the lifting device further includes a control device to control the application of power from said power source to both said first and second actuator devices.

Preferably, the first actuator device includes a reversible hydraulic linear actuator and a guide to prevent any rotational displacement of said first mobile section relative to said fixed section, said power source being a hydraulic pump connected to an electrical motor and said control device includes a hydraulic network.

Preferably, the second actuator device includes a reversible hydraulic rotary actuator, said blocking mechanism holding said rotary actuator at a plurality of predetermined rotated positions, all angles between two adjacent positions being equal to each other.

Preferably, the hydraulic network includes a regeneration circuit connected to said linear actuator, said regeneration circuit includes a hydraulic valve and check valves used for rapid raising of said first mobile section from said operative position to said non-operative position.

Preferably, the first mobile section includes an attachment device adapted to be removably engaged by a linear actuator backup device, said hydraulic network includes a pressure relief valve connected to said linear actuator whereby said first mobile section can be raised by said actuator backup and activation of said pressure relief valve upon failure of said linear actuator.

Preferably, the rolling device includes a plurality of wheels, said wheels are mounted with their respective axis of rotation parallel to each other, and a track rotatably engaging and covering all of said wheels.

The present invention is also directed to a combination of two lifting devices, wherein each one of said lifting device is adapted to be secured to a respective side of said trailing end, both said power sources being linked together to similarly and simultaneously activate both first actuator devices and both second actuator devices respectively.

BRIEF DESCRIPTION OF THE DRAWINGS

In the annexed drawings, like reference characters indicate like elements throughout.

FIG. 3 is a rear view taken along line 3—3 of FIG. 2a;

DETAILED DESCRIPTION OF THE PREFERRED EMBODIMENTS

Referring to FIGS. 1a to 8, there is shown a lifting device 20 for lateral displacement of the trailing end of road vehicles, preferably for trailers T, semi-trailers and the like. The lifting device 20 lifts the trailing end of the trailer T such that the rear wheels W loose contact from the road, then, the trailing end of the trailer is forced to move in a predetermined direction set to the device 20 when the trailer T is being towed by the tractor A.

Figure 1A:
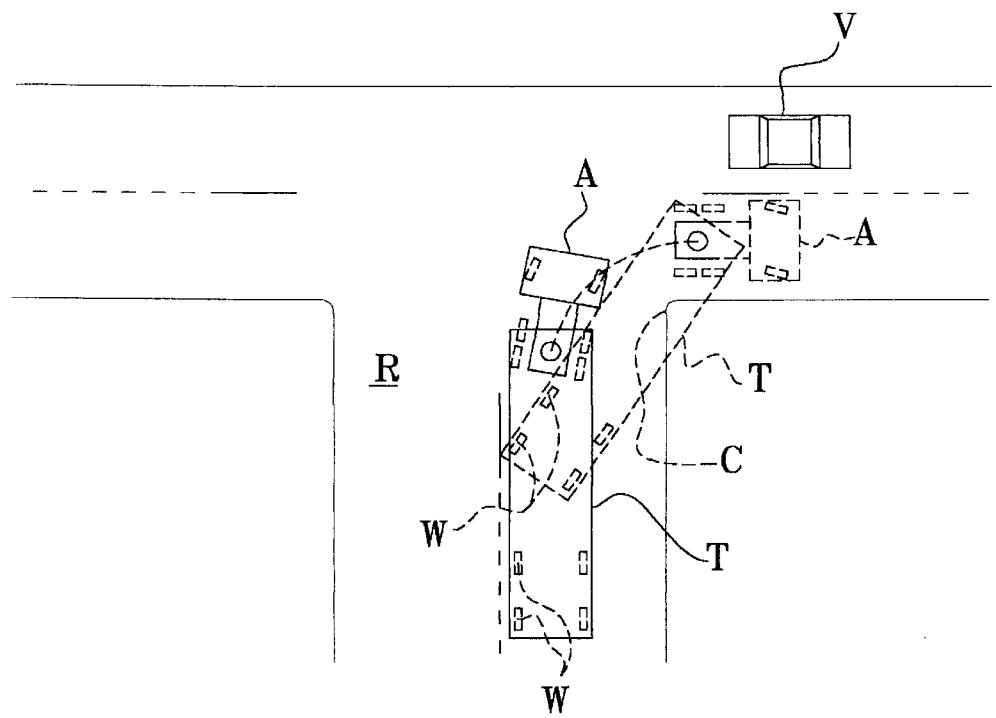
FIGS. 1a and 1b are schematic illustrations of the trailer being towed, showing the paths that would be taken without and with an embodiment of the lifting device of the present invention respectively.

As shown in FIG. 1a, without any lifting device 20, the trailer T, especially of a certain length, tends to take short corners and go over the sidewalks corner C of a road R, as represented in dashed lines, when towed by the tractor A that makes a 90 degree angle turn.

Figure 1B:
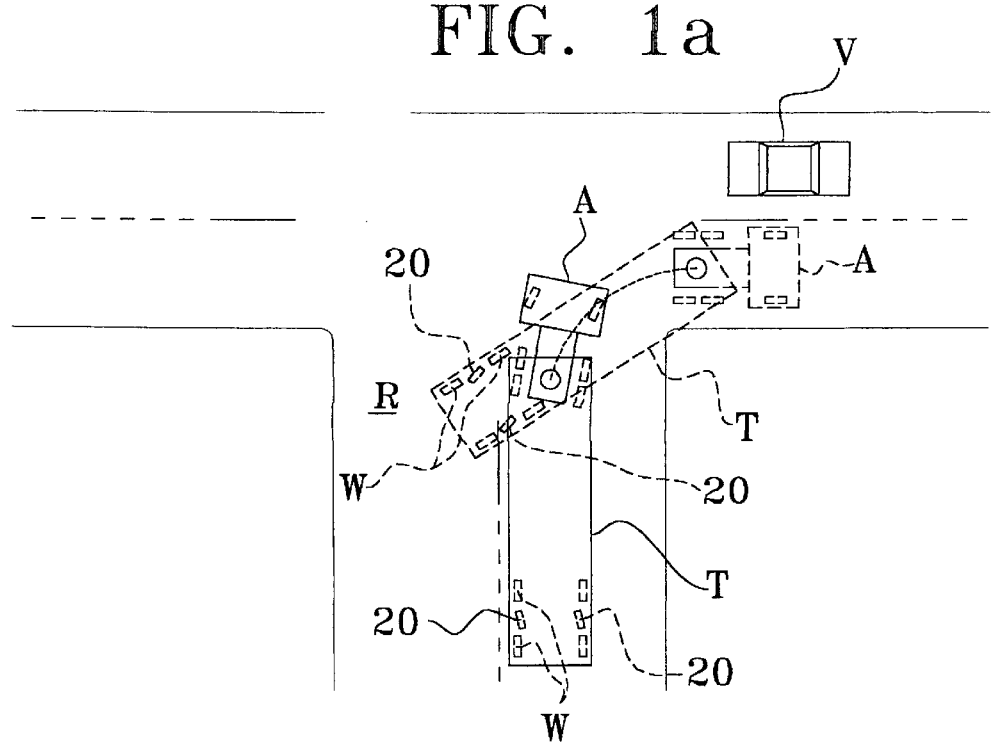

When lifting devices 20 are used, as shown in FIG. 1b, close to the rear wheel train, the latter being forced to follow a predetermined direction imposed by the orientation of the portion of the lifting devices 20 in contact with the road R. Consequently, the trailing end tends to move away from the corners C without having the tractor A taking very large corners and possibly hit other vehicles V stopped in the opposite direction lane.

Figure 2A:
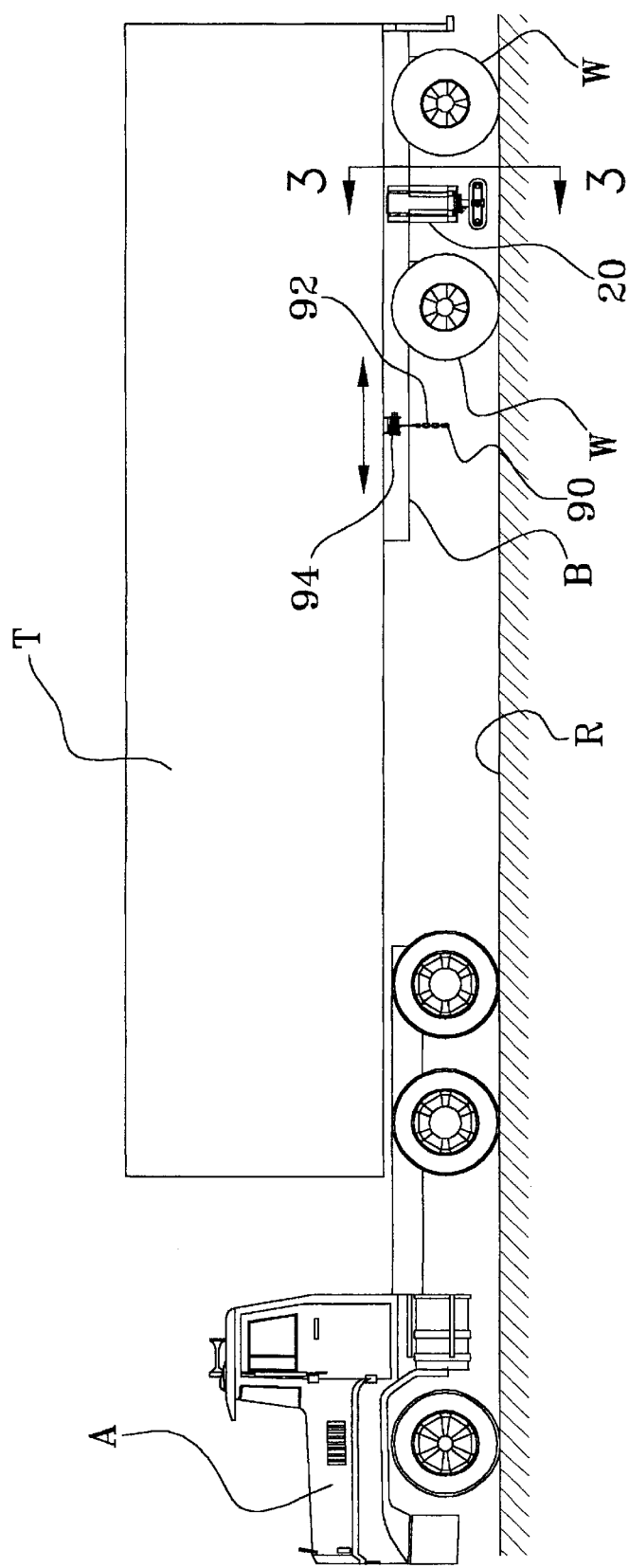
FIGS. 2a and 2b are side elevation views of the tractor-trailer units with an embodiment of the lifting device of the present invention in a non-operative and in an operative position respectively.
Figure 2B:
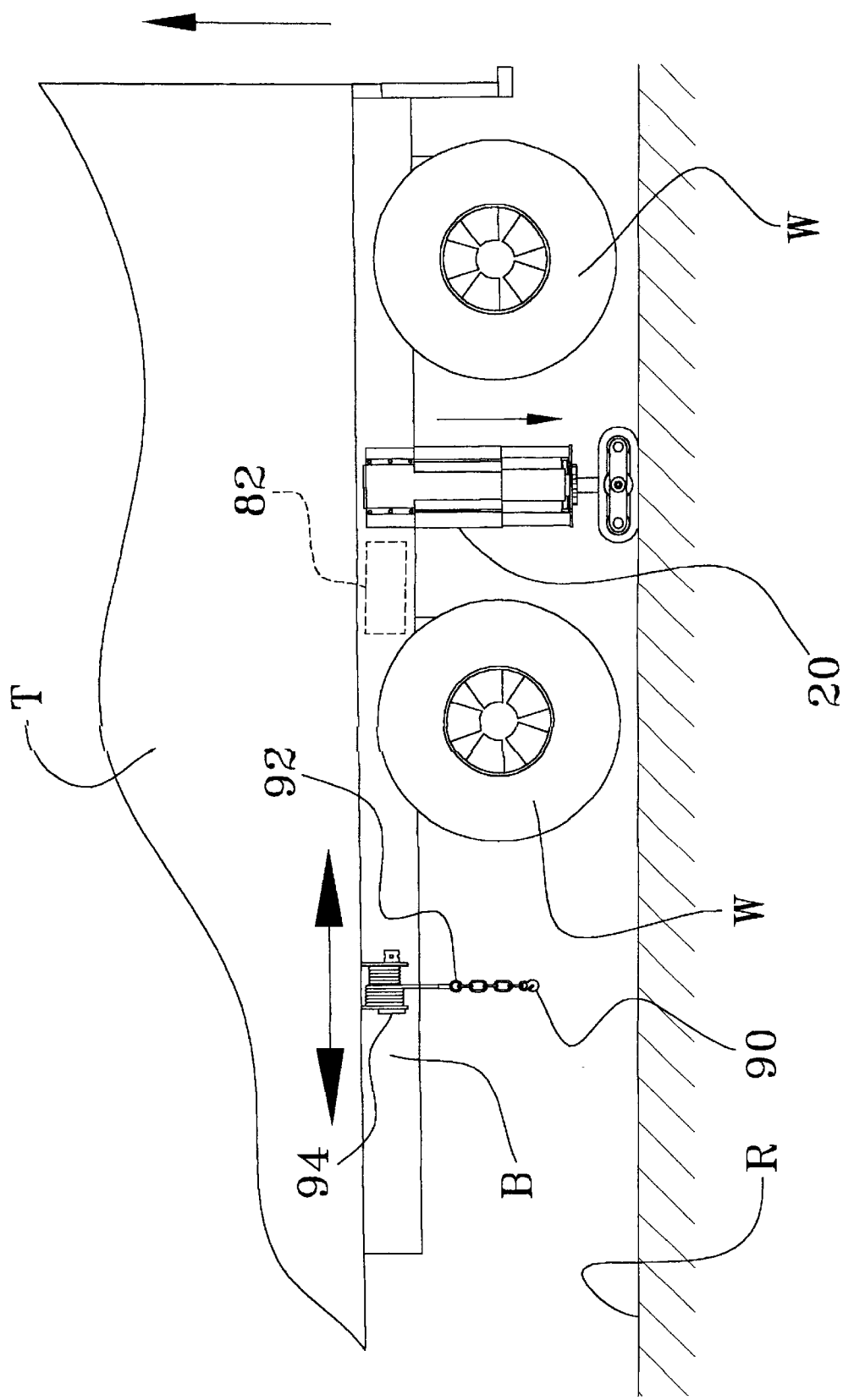

According to FIGS. 2a and 2b, the lifting device 20 is adapted to be rigidly secured to the walking beams B at the trailing end of the trailer T. Preferably, the lifting device 20 is located inbetween to rear wheels W, eventhough it could be located at the front or the back of the latter. In FIG. 2a, the lifting device 20 is in its non-operative retracted position, when the trailer T is towed by the tractor A. While in FIG. 2b, the lifting device 20 is in its operative extended position, supporting the weight of the trailing end of the trailer T since the rear wheels W are slightly lifted up away from the surface of the road R.

Figure 3:
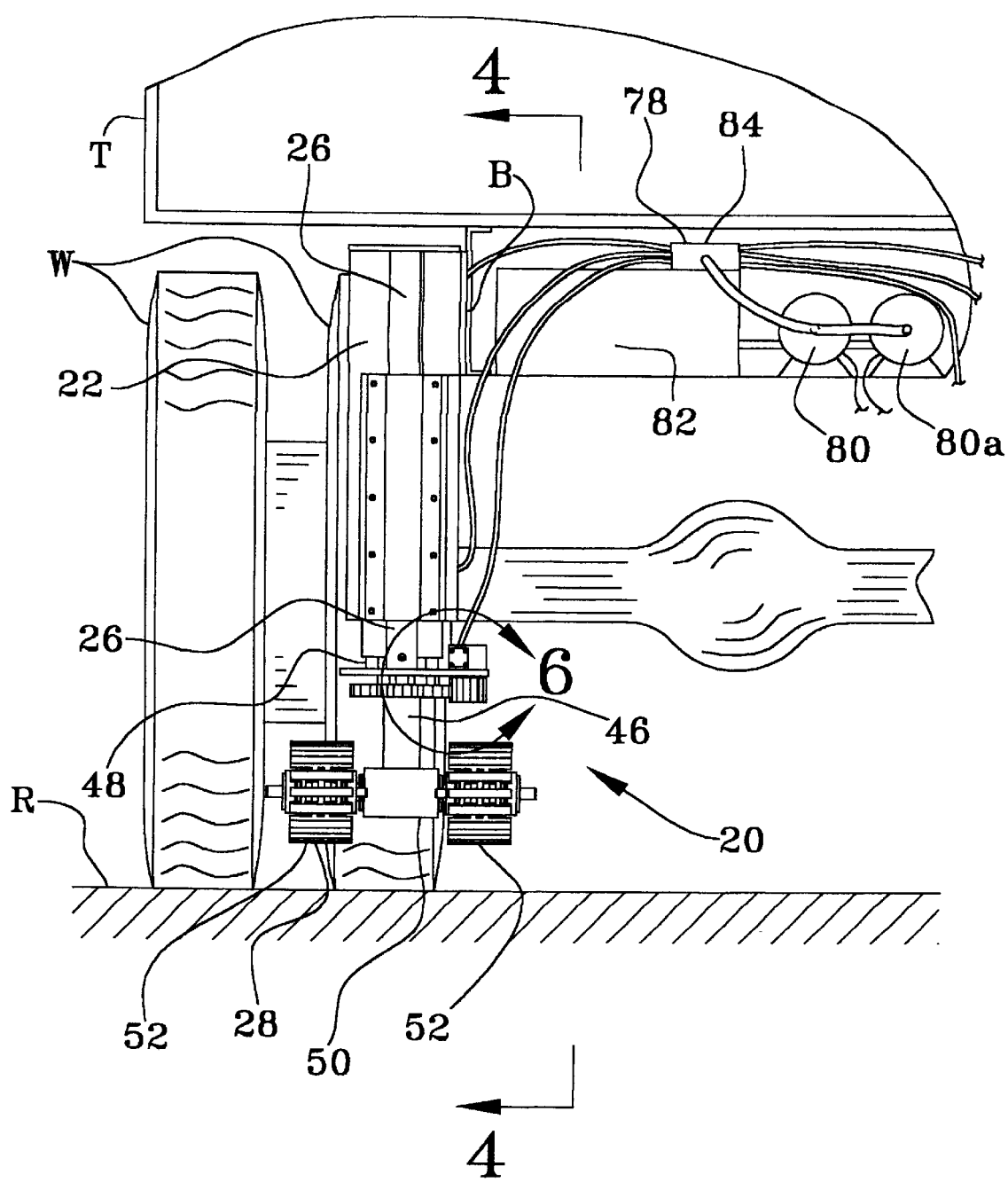
Figure 4:
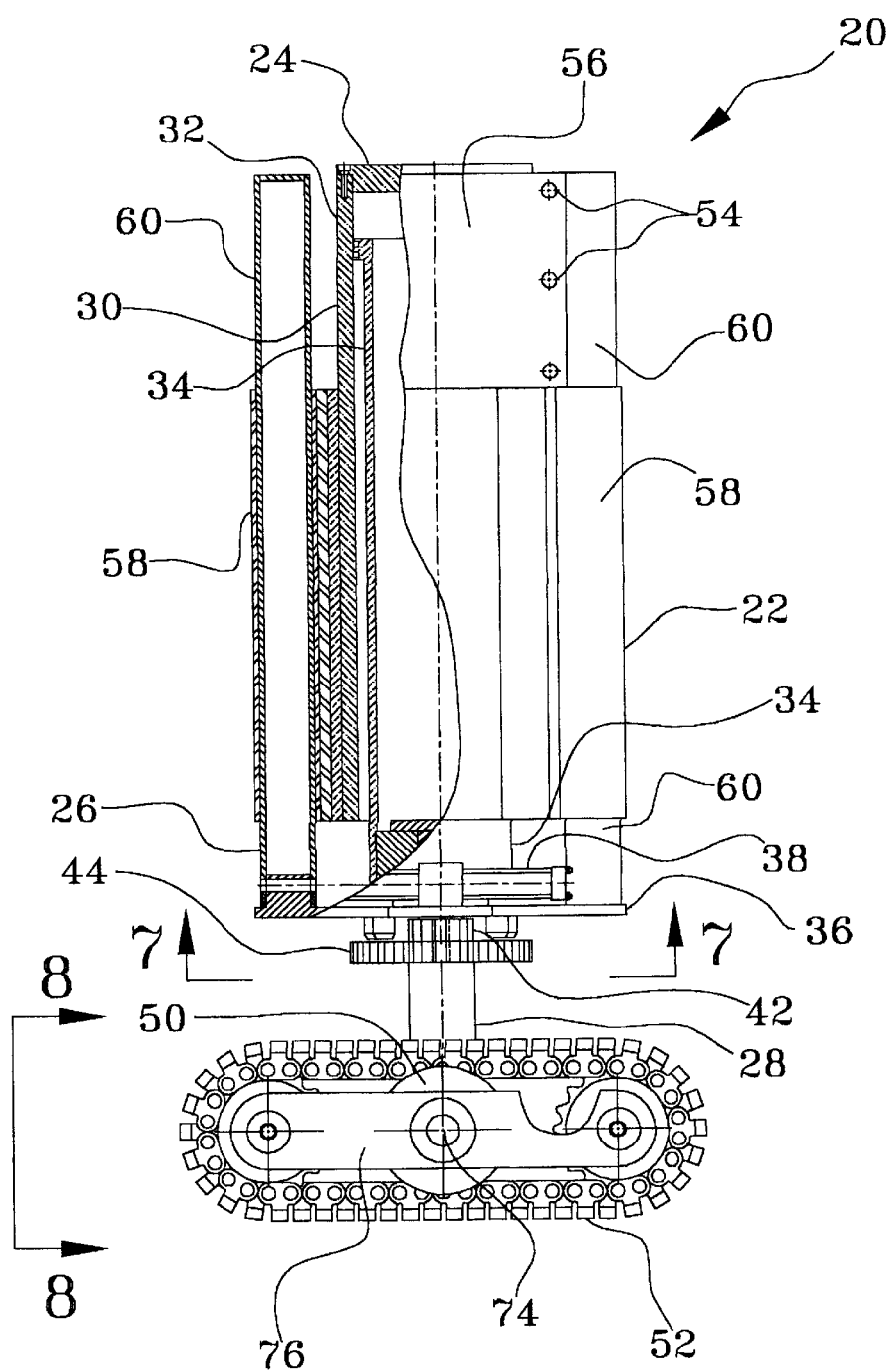
FIG. 4 is a partial section view taken along line 4—4 of FIG. 3.
Figure 4A:
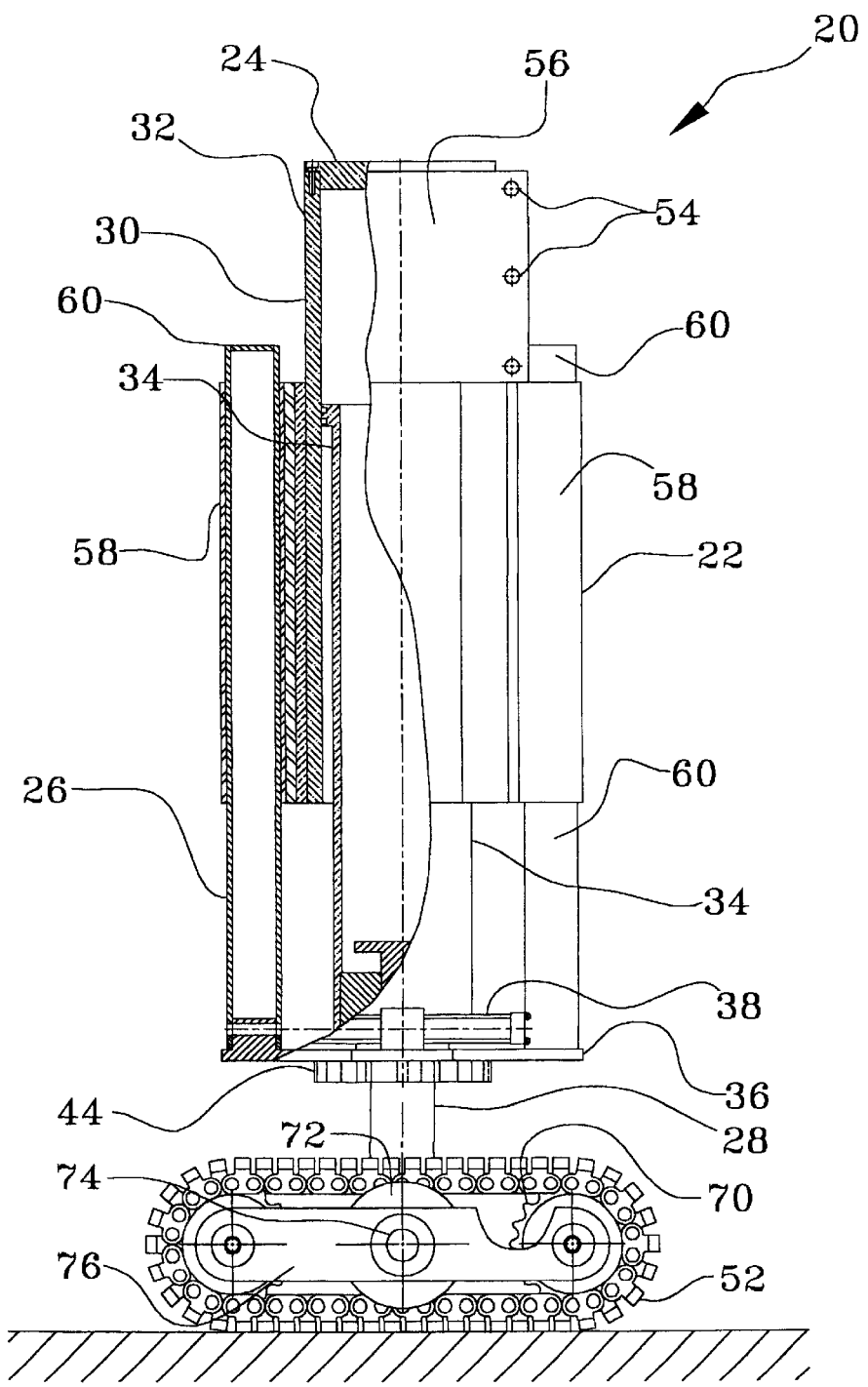
FIG. 4a is a view similar to FIG. 4 showing the lifting device in an operative position.
Figure 5:
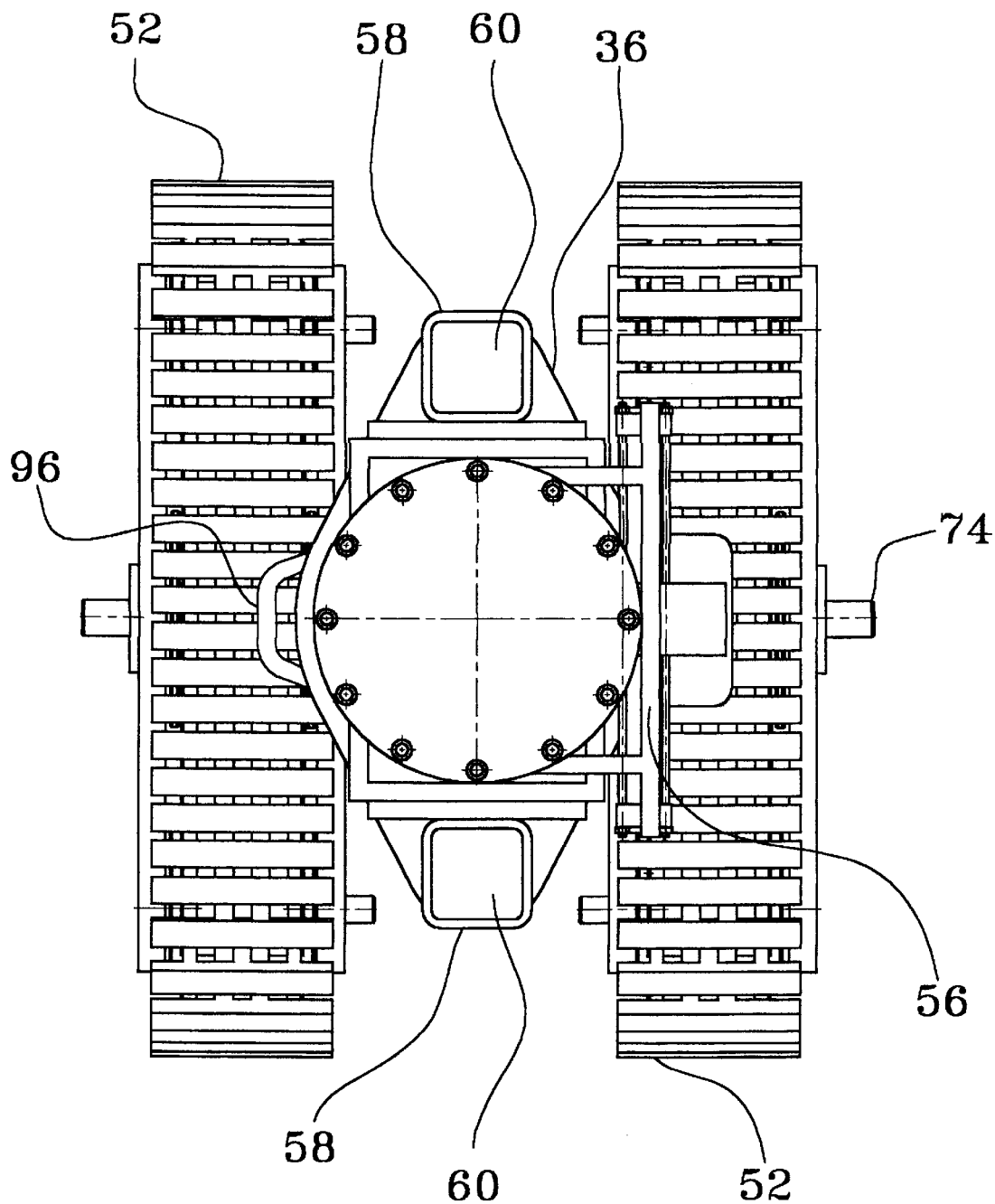
FIG. 5 is a top plan view of the lifting device of FIG. 4.

As seen in FIGS. 3 to 4a, the lifting device 20 comprises a main body 22 that generally includes a fixed section 24 rigidly secured to the walking beam B, a first mobile section 26 and a second mobile section 28. The first mobile section 26 is essentially vertically moving with respect to the fixed section 24 via a first actuator device, preferably a reversible hydraulic linear actuator 30. The fixed section 24 is the outer cylinder 32 of the actuator 30. The external free end of the inner piston 34 of the actuator 30 is essentially formed of a plate 36 supporting the second actuator device, preferably a reversible hydraulic rotary actuator 38.

The rotary actuator 38 is adapted to drive a pinion 42 that slidably engages a sprocket gear 44 itself secured to the upper part 46 of the second mobile section 28 of the lifting device 20. That second mobile section 28 essentially co-axially rotates around the axis of the sprocket gear 44 and the first mobile section 26, and is supported at the base 48 of the piston 34. The lower part 50 of the second mobile section 28 includes a rolling device, preferably two adjacent tracks 52, pivotally free mounted thereon. The tracks 52 are preferably on each side and diametrically opposed of the rotational axis of the second mobile section 28. The two tracks 52 rollingly engage the surface of the road R when the device is in operative position.

The fixed section 24 is preferably secured to the walking beam B using six mounting bolts 54 on a flat mounting plate 56, as well as through a plurality of reinforcing braces (not shown), as required. The mounting bolts 54 are easily accessible for dismounting of the lifting device 20 whenever required. The fixed section 24 also includes guides, preferably two sleeves 58 adjacent and parallel to the cylinder 32 and located diametrically apart from the latter. The two sleeves 58 generally have a rounded square cross-section adapted to slightly receive two bars 60 also with rounded square cross-section secured to the first mobile section 26. These two bars 60 prevent any rotational movement of the first mobile section 26 around the fixed section 24.

Figure 6:
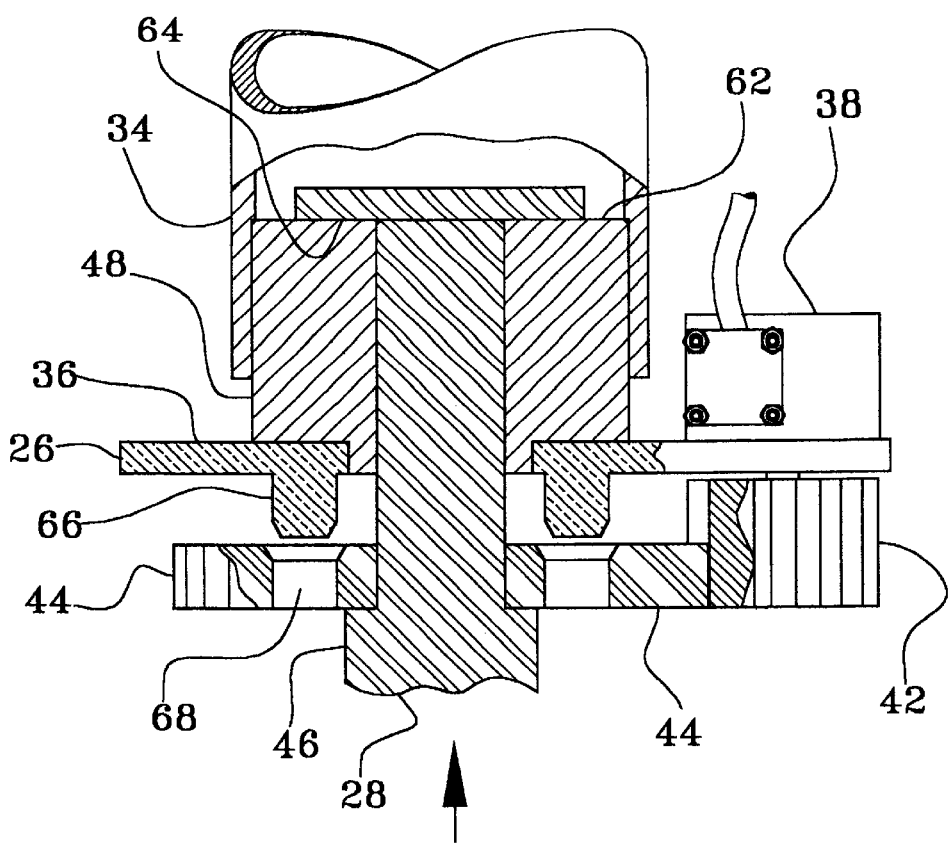
FIG. 6 is an enlarged partial section view taken along line 6 of FIG. 3.

As pictured in FIG. 6, the base 48 of the piston 34 is adapted to co-axially receive the upper part 46 of the second mobile section 28 and provides a shoulder 62 as an abutment support for a radial flange 64 at the extremity of the upper part 46 when the lifting device 20 is in the non-operative position, under the gravity weight of the second mobile section 28.

The plate 36 supporting the rotary actuator 38 also includes a blocking mechanism to prevent the second mobile section 28 from rotating about the first mobile and fixed sections 26, 24 when the lifting device 20 is in operative position. The blocking mechanism preferably includes a plurality of short pins 66, generally cylindrical and located at the lower edge of the plate 36, circularly positioned around the axis of the sprocket gear 44 and sized to tightly and releasably engage corresponding holes 68 located on the sprocket gear 44, see FIGS. 6 and 7. When tracks 52 engage the road R under activation of the linear actuator 30, the pins 66, preferably having chamfered extremities for final self-alignment, start engaging the corresponding holes 68 until the sprocket gear 44 abuts against the plate 36, thus locking the second mobile section 28 of the lifting device 20 in place ready for operation. Upon retraction of the lifting device 20, the blocking mechanism automatically releases the pins 66 from the corresponding holes 68 to allow for repositioning of the second mobile section 28 to its non-operative zero degree angle position.

Essentially, the pins 66 and their corresponding holes 68 are equally distributed at predetermined rotational angle positions, preferably every 15 degrees form one to another, to rotationally position the second mobile section 28 and its tracks 52 around its rotational axis, with respect to the fixed section 24 and the trailer T. The rotational angle is set by the controlled displacement of the rotary actuator 38.

Figure 8:
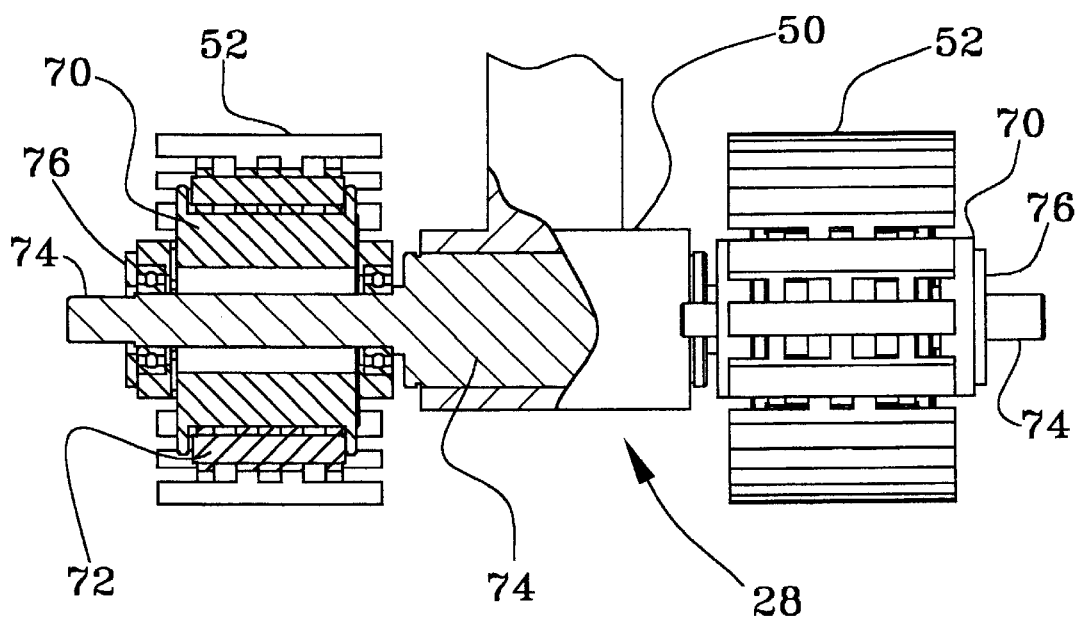
FIG. 8 is a partial section enlarged view taken along line 8—8 of FIG. 4.
Figure 7:
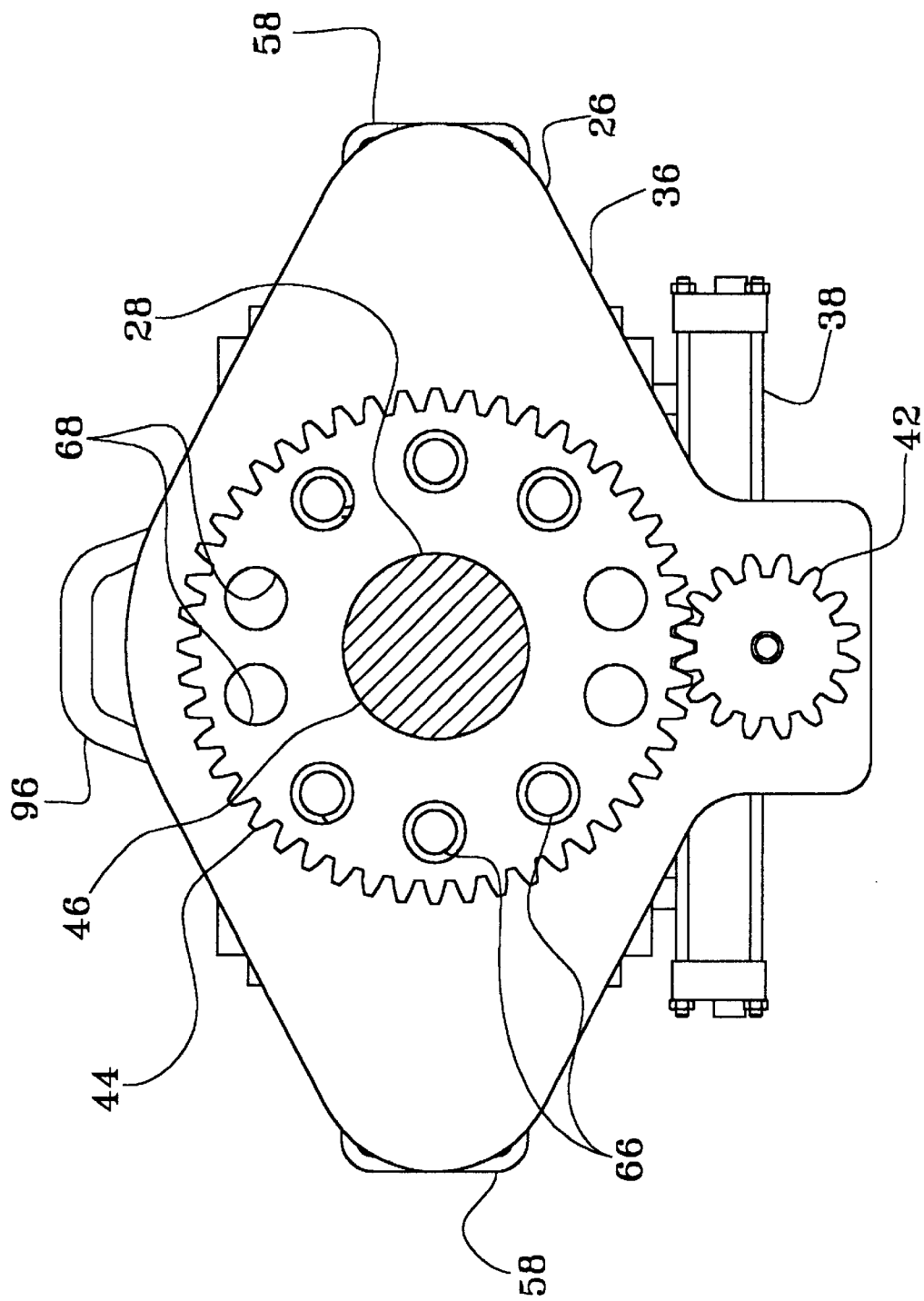
FIG. 7 is a section view taken along line 7—7 of FIG. 4.

As shown in FIGS. 4 and 8, each tracks 52 preferably covers three wheels 70 free to rotate about and with their respective axis of rotation, preferably via standard ball bearings, all co-linear and parallel to each other. Out of the six wheels 70, the two central ones 72 have a common shaft 74 that is preferably pivotally mounted on bearings onto the lower part 50 of the second mobile section 28 to allow for the tracks 52 to easily adapt to and roll onto any deformation of the surface of the road R. The four remaining wheels 70 are independent from each other and held in place by sidebars 76.

To drive the two reversible hydraulic actuators 30, 38, a power source, preferably a hydraulic network including a control device 78 and hydraulic pumps 80, 80a pressurizing the hydraulic fluid from a reservoir 82 is used. The fluid is directed to the proper actuator via standard bi-directional valve controls 84. The pumps 80, 80*a* are driven by the electrical motors 85 powered by the standard 12 volt direct current tension source available from the alternator/battery 86 of the road vehicle. The hydraulic network is preferably closely located to the lifting devices 20 connected thereto and, is preferably remotely controlled via the control device 78 by the tractor driver, while seated in the tractor A. Preferably, a first pump 80 is used to supply the large quantity of hydraulic fluid required for the extended displacement of the pistons 34 of linear actuators 30 and, a second pump 80*a* is series connected to the first one to ensure proper fluid pressure as required for the heavy weight being lifted by the lifting devices 20, when the trailer T carries heavy loads.

Figure 9:
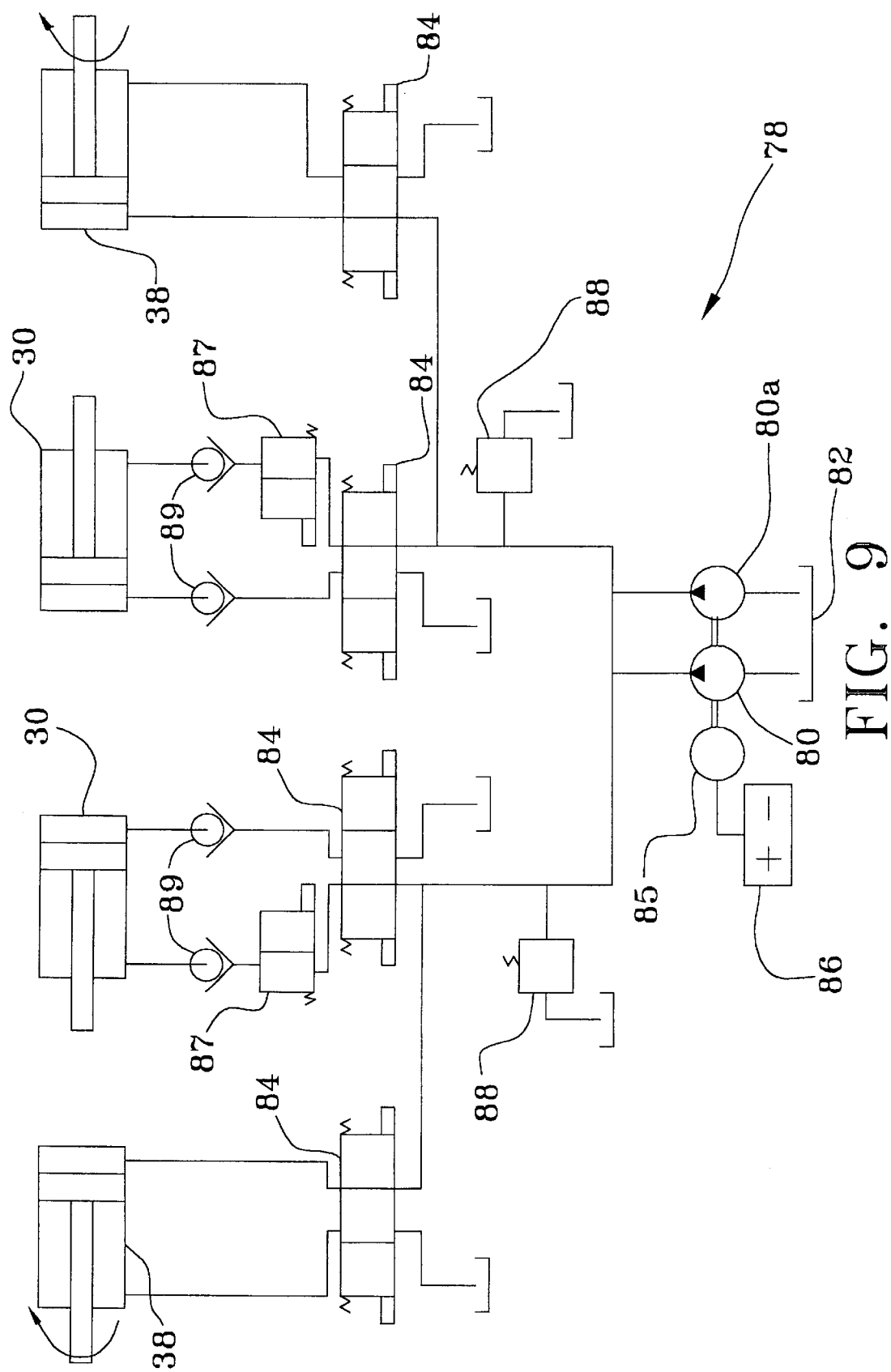
FIG. 9 is a diagrammatic representation of the hydraulic control network used in conjunction with the preferred embodiment of the present invention.

FIG. 9 shows the diagram of the hydraulic network including its control device 78 formed of the different bi-directional valve controls 84. Preferably, in order to accelerate the displacement of the linear actuator from the lowered operative position to the raised non-operative position using the two pumps 80, 80*a*, a regeneration circuit is used via a hydraulic valve 87 and its corresponding check valves 89. When two lifting devices 20 are used, one on each side of the trailing end of the trailer T, their respective actuators 30, 38 are similarly and simultaneously activated by the same pumps 80, 80*a*.

Preferably, pressure relief valves 88 are provided for emergency cases when the lifting device 20 undergoes some problems and the linear actuator 30 needs to be manually retracted using a linear actuator backup device, preferably in the form of a hook 90 connected to a cable 92 and a common manual hitch 94. The hook 90 then removably engages an attachment device, preferably an eyelet 96 provided on plate 36 of the first moving section 26 (see FIGS. 2*b* and 7) to allow for easy manual retraction of the latter. In general, hitch 94 is already available since many hitches are typically slidably mounted on the longitudinal edges of the trailer T for securing the trailer load.

Although embodiments have been described herein with some particularity and details, many modifications and variations of the preferred embodiment are possible without deviating from the scope of the present invention.

The embodiments of the invention, in which an exclusive property or privilege is claimed, are defined as follows:

1. A lifting device for lifting a trailing end of a road vehicle and to laterally displace said trailing end, said lifting device comprising a main body including a fixed section adapted to be rigidly secured to said trailing end, a first mobile section vertically movable relative to said fixed section between an elevated non-operative position and a lowered operative position for lifting said trailing end, and a second mobile section being rotatably mounted on said first mobile section, a first actuator device to linearly move said first mobile section relative to said fixed section, a second actuator device for rotating said second mobile section relative to said first mobile section, a rolling device secured to said second mobile section to rollingly engage a road surface, a blocking mechanism to temporarily block said second actuator device from rotating when in said operative position, and a power source to activate both said first and second actuator devices.

2. A lifting device as defined in claim 1, wherein said rolling device is freely pivotally mounted on said second mobile section.

3. A lifting device as defined in claim 1, further including a control device to control the application of power from said power source to both said first and second actuator devices.

4. A lifting device as defined in claim 3, wherein said first actuator device includes a reversible hydraulic linear actuator and a guide to prevent any rotational displacement of said first mobile section relative to said fixed section, said power source being a hydraulic pump connected to an electrical motor and said control device includes a hydraulic network.

5. A lifting device as defined in claim 4, wherein said second actuator device includes a reversible hydraulic rotary actuator, said blocking mechanism holding said rotary actuator at a plurality of predetermined rotated positions, all angles between two adjacent positions being equal to each other.

6. A lifting device as defined in claim 4, wherein said hydraulic network includes a regeneration circuit connected to said linear actuator, said regeneration circuit includes a hydraulic valve and check valves used for rapid raising of said first mobile section from said operative position to said non-operative position.

7. A lifting device as defined in claim 4, wherein said first mobile section includes an attachment device adapted to be removably engaged by a linear actuator backup device, said hydraulic network includes a pressure relief valve connected to said linear actuator whereby said first mobile section can be raised by said actuator backup and activation of said pressure relief valve upon failure of said linear actuator.

8. A combination of two lifting devices as defined in claim 1, wherein each one of said lifting device is adapted to be secured to a respective side of said trailing end, both said power sources being linked together to simultaneously activate both first actuator devices and both second actuator devices respectively.

9. A combination of two lifting devices as defined in claim 2, wherein each one of said lifting device is adapted to be secured to a respective side of said trailing end, both said power sources being linked together to simultaneously activate both first actuator devices and both second actuator devices respectively.

10. A lifting device as defined in claim 1, wherein said rolling device includes a plurality of wheels, said wheels are mounted with their respective axis of rotation parallel to each other, and a track rotatably engaging and covering all of said wheels.

11. A lifting device as defined in claim 2, wherein said rolling device includes a plurality of wheels, said wheels are mounted with their respective axis of rotation parallel to each other, and a track rotatably engaging and covering all of said wheels.

12. A lifting device as defined in claim 5, wherein said rolling device is freely pivotally mounted on said second mobile section.

\* \* \* \* \*